(12) United States Patent
Baury et al.

(10) Patent No.: US 10,836,510 B2
(45) Date of Patent: Nov. 17, 2020

(54) NAVAL PLATFORM PROVIDED WITH A DECK LANDING/TAKE-OFF ZONE AND MEANS FOR HANDLING AN AIRCRAFT

(71) Applicant: NAVAL GROUP, Paris (FR)

(72) Inventors: Alexandre Baury, Ruelle sur Touvre (FR); Pierre Raspic, Ruelle sur Touvre (FR); Jerôme Perillaud, Ruelle sur Touvre (FR)

(73) Assignee: NAVAL GROUP, Paris (FR)

( * ) Notice: Subject to any disclaimer, the term of this patent is extended or adjusted under 35 U.S.C. 154(b) by 0 days.

(21) Appl. No.: 16/347,094

(22) PCT Filed: Dec. 1, 2017

(86) PCT No.: PCT/EP2017/081241
§ 371 (c)(1),
(2) Date: May 2, 2019

(87) PCT Pub. No.: WO2018/100186
PCT Pub. Date: Jun. 7, 2018

(65) Prior Publication Data
US 2019/0270525 A1    Sep. 5, 2019

(30) Foreign Application Priority Data
Dec. 1, 2016 (FR) ...................................... 16 01702

(51) Int. Cl.
*B63B 35/50* (2006.01)
*B64F 1/12* (2006.01)
*B64F 1/22* (2006.01)

(52) U.S. Cl.
CPC .............. *B64F 1/125* (2013.01); *B63B 35/50* (2013.01); *B64F 1/22* (2013.01)

(58) Field of Classification Search
CPC .... B64F 1/12; B64F 1/125; B64F 1/22; B63B 35/50; B63B 35/53
(Continued)

(56) References Cited

U.S. PATENT DOCUMENTS 3,640,490 A * 2/1972 Baekken ................. B64F 1/125
244/116
3,790,111 A * 2/1974 Mesnet ................... B64F 1/125
244/116

(Continued)

OTHER PUBLICATIONS

International Search Report, dated Feb. 6, 2018, from corresponding PCT application No. PCT/EP2017/081241.

(Continued)

*Primary Examiner* — Daniel V Venne
(74) *Attorney, Agent, or Firm* — Nixon & Vanderhye

(57) ABSTRACT

A naval platform has a zone for the deck landing/take-off of an aircraft and an aircraft handler, to move the aircraft over the deck landing/take-off zone. The aircraft handler includes a body in the form of a bar for gripping and securing the main landing gear of the aircraft, provided with an anchoring hook mounted to slide in at least one rail, guiding the the aircraft on the deck landing/take-off zone. The hook is retractable, allowing the release of the body in the form of a gripping and securing bar from the rail, the body gripping the landing gear of the aircraft. The movement of the aircraft brings the body into position on the rail, and the hook into a position in which it faces the rail, and the hook back into an anchoring position in the rail in order to secure the aircraft.

20 Claims, 5 Drawing Sheets

(58) Field of Classification Search
USPC .................. 114/258, 261; 244/116; 180/904; 414/427
See application file for complete search history.

(56) References Cited

U.S. PATENT DOCUMENTS

| | | | | |
|---|---|---|---|---|
| 4,319,722 A * | 3/1982 | Pesando | .................. | B64F 1/125 |
| | | | | 114/261 |
| 4,529,152 A * | 7/1985 | Bernard | .................. | B64F 1/125 |
| | | | | 244/116 |
| 5,098,035 A * | 3/1992 | Bernard | .................. | B64F 1/125 |
| | | | | 244/116 |
| 5,248,115 A * | 9/1993 | Aurelio | .................. | B64F 1/125 |
| | | | | 114/261 |
| 5,806,795 A * | 9/1998 | Ortelli | ..................... | B64F 1/125 |
| | | | | 180/904 |
| 6,176,671 B1 * | 1/2001 | Ortelli | ...................... | B64F 1/12 |
| | | | | 414/427 |
| 10,351,260 B2 * | 7/2019 | Williamson | ............ | B64F 1/125 |
| 10,577,127 B2 * | 3/2020 | Williamson | ............. | B64F 1/22 |

OTHER PUBLICATIONS

French Search Report, dated Jun. 1, 2017, from corresponding FR application No. 16 01702.

* cited by examiner

NAVAL PLATFORM PROVIDED WITH A DECK LANDING/TAKE-OFF ZONE AND MEANS FOR HANDLING AN AIRCRAFT

BACKGROUND OF THE INVENTION

Field of the Invention

The present invention relates to a naval platform.

More specifically, the invention relates to a naval platform equipped with a landing/takeoff zone for at least one aircraft.

Description of the Related Art

Such naval platforms are for example made up of surface vessels such as corvettes, frigates or projection buildings, or even aircraft carriers.

Of course, other platforms, such as offshore oil platforms or the like, equipped with zones intended to receive helicopters, can also be considered.

Traditionally, these platforms are also equipped with industrial motorized trucks, for example with motors, for handling the aircraft to move it on the platform.

Thus for example, and in the case where the platform is made up of a vessel such as a corvette or a frigate, such industrial motorized trucks are used for example to move a helicopter, between the landing/takeoff zone of the platform and a storage hangar thereof, provided near said zone on said platform.

These industrial motorized trucks facilitate interventions by operators and in particular facilitate and secure the handling of fairly large loads, for example a helicopter weighing several tons.

Many industrial motorized trucks have already been proposed for this type of application in the state of the art.

These generally include energy storage devices, motors and aircraft coupling systems, allowing an operator, through remote control, for example, to control these industrial motorized trucks to grasp and move the aircraft.

However, these industrial motorized trucks have a certain number of drawbacks, in particular in the considered application on board such a naval platform.

Indeed and for various operational reasons, it must be possible to move the aircraft, and in particular a helicopter, on such a platform, on heavy and even very heavy seas, and in violent winds.

The platform is then subject to relatively significant movements, reflected by risks of uncontrolled movements/displacements of the aircraft on the platform and more particularly on the landing/take off zone.

The aircraft may in fact undergo forces causing total or partial slippage, or even tilting thereof.

It is easy to imagine the repercussions of such a loss of control of the aircraft not only for its structure and that of the platform, but also for the safety of the operators on board, and in particular the staff assigned to the aviation part of the platform.

Another problem appears in light of the current size of the landing/takeoff zones and the aircraft intended for these platforms.

Indeed, helicopters are increasingly large and the zones are tending to become smaller, which requires maneuvering these aircraft multiple times, applying increasingly large and frequent stresses on the structures thereof.

Yet the structure of these aircraft has not always been sized to withstand such handling.

Furthermore, the configurations of the landing/takeoff zones means that it may be necessary to impart very pronounced curved trajectories to these industrial motorized trucks, to move the aircraft between the hangar and the landing/takeoff zone.

It is also increasingly common for the landing/takeoff zones and the hangars to be at different heights and for the aircraft handling system and the aircraft then to be made to go up or down portions for example in ramp form, which is also not provided in the earlier systems.

Lastly, the aircraft generally sets down in different locations each time and may even be set down in a location of the zone that is difficult to access in complete safety.

The invention therefore aims to resolve these problems.

SUMMARY OF THE INVENTION

To that end, the invention relates to a naval platform equipped with a deck landing/takeoff zone for at least one aircraft and an aircraft handling system, for moving the aircraft over said deck landing/takeoff zone, the aircraft handling system including a bar for gripping and securing the main landing gear of the aircraft, provided with an anchoring hook mounted such that the anchoring hook can slide in at least one rail for guiding the movements thereof, and therefore of the aircraft, on the deck landing/takeoff zone, and in that the hook is retractable to allow the release of the gripping and securing bar from the rail, the positioning of said gripping and securing bar such that the gripping and securing bar grips the landing gear of the aircraft, the movement of the aircraft so as to bring the gripping and securing bar into position on said at least one rail and the anchoring hook into a position in which the anchoring hook faces said rail, and the movement of said anchoring hook back into an anchoring position in said at least one rail in order to secure the aircraft.

The platform according to the invention may include one or more of the following features, considered alone or according to any technically possible combination(s):

- the anchoring hook is mounted so as to be movable between an active anchoring position and a retracted position for movement of the member that is a gripping and securing bar, via a lever able to be manipulated by an operator;
- the lever is able to be moved by an operator and associated with an indicator bar configured to indicate the active or retracted position of the anchoring hook;
- the ends of the member forming the gripping and securing bar comprise attachment devices configured to attach first ends of securing cables, the second ends of which are associated with maneuvering devices for moving and securing the aircraft on the platform;
- the maneuvering devices each comprise a gear motor associated with a drum for winding/unwinding the cable and return pulleys for the cable;
- it includes maneuvering devices arranged symmetrically on either side of the deck landing/takeoff zone;
- the naval platform includes a harpoon grate for the aircraft in the deck landing/takeoff zone and a storage hangar for said aircraft;
- the maneuvering devices are placed between the deck landing/takeoff zone and the hangar to secure the movements of the aircraft between the deck landing/takeoff zone and said at least one rail;
- the aircraft handling system comprises a motorized truck for grasping the auxiliary landing gear of the aircraft to move the latter;
- it includes two parallel guide rails.

BRIEF DESCRIPTION OF THE DRAWINGS

The invention will be better understood upon reading the following description, provided solely as an example, and done in reference to the appended drawings, in which.

DESCRIPTION OF THE PREFERRED EMBODIMENTS

Figure 1:
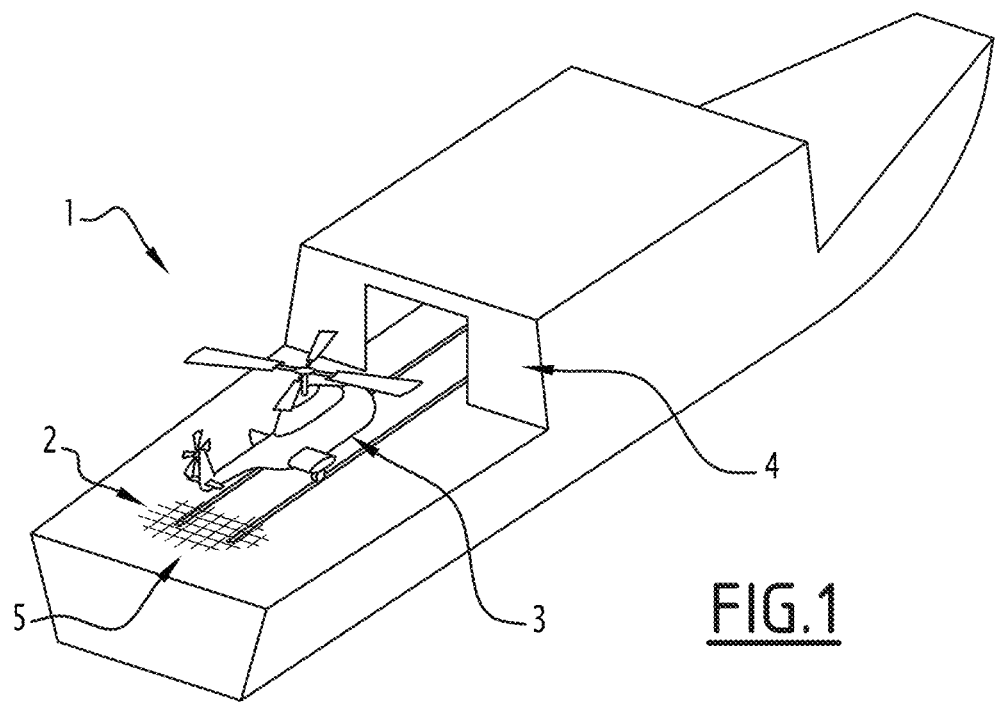
FIG. 1 shows a partial perspective view of one example embodiment of a naval platform according to the invention, equipped with a deck landing/takeoff zone of an aircraft and a hangar.

In these figures, and in particular in FIG. 1, a naval platform is illustrated and designated by general reference 1.

In the example embodiment illustrated in this FIG. 1, the naval platform 1 is made up of a surface building, such as a corvette or a frigate.

Of course and as previously indicated, other examples of platforms can be considered.

In the described example, the naval platform 1 therefore includes, in its rear part, a deck landing/takeoff zone, designated by general reference 2, for an aircraft, designated by general reference 3, made up, in the described example, of a rotary-wing aircraft such as a helicopter.

Other types of aircraft may be considered.

Likewise, drones may be considered.

The platform 1 is also provided, in the described example, with a storage hangar 4 for this type of aircraft and for example this helicopter, near this deck landing/takeoff zone 2.

It will also be noted that the deck landing/takeoff zone 2 of the platform 1 may for example be equipped in a manner known in itself with a harpoon grate for the aircraft 3.

This harpoon grate is designated by general reference 5 in this FIG. 1.

The structure of this grate 5 and that of the harpoon of the helicopter being well known in the state of the art, they will not be described in more detail hereinafter.

It will simply be noted that this grate 5 is suitable for example for receiving a harpoon carried by the helicopter, in order to secure the position thereof on the platform 1, and more particularly above this grate.

As previously indicated, the helicopter must be able to be moved easily and safely, between the deck landing/takeoff zone 2 and the hangar 4 of the platform 1.

To that end, an aircraft handling and securing system 100 to handle and secure the aircraft 3 are used to move it.

Such aircraft handing and securing system 100 is in fact made available to the on-board staff, and more particularly operators of the aviation zone of the platform, to assist them during these maneuvers.

FIGS. 2 to 10 show an example embodiment and installation of the aircraft handling and securing system 100 on a deck landing/takeoff zone of said platform.

In these figures, one can indeed see the naval platform, which is still designated by general reference 1, the deck landing/takeoff zone thereof, designated by general reference 2, the aircraft designated by general reference 3, and the hangar designated by general reference 4.

As also illustrated in these figures, an industrial motorized truck, for example motorized, designated by general reference 6 in these figures, is used to grasp the aircraft 3 for example at its auxiliary landing gear at the front thereof.

This auxiliary landing gear of the aircraft is for example provided with casters or the like.

These industrial motorized trucks are already well known in the state of the art, such that they will not be described in more detail below.

It will simply be noted that this industrial motorized truck is for example an industrial motorized truck equipped with an energy storage system and electric motors and which is operated remotely for example by an operator, through a remote control, to make it possible to move the aircraft.

The handling and securing system to handle and secure the aircraft also further comprises a member that is a bar for gripping and securing the main landing gear of the aircraft.

This member that is a gripping and securing bar is designated by general reference 7 in these figures.

Figure 4:
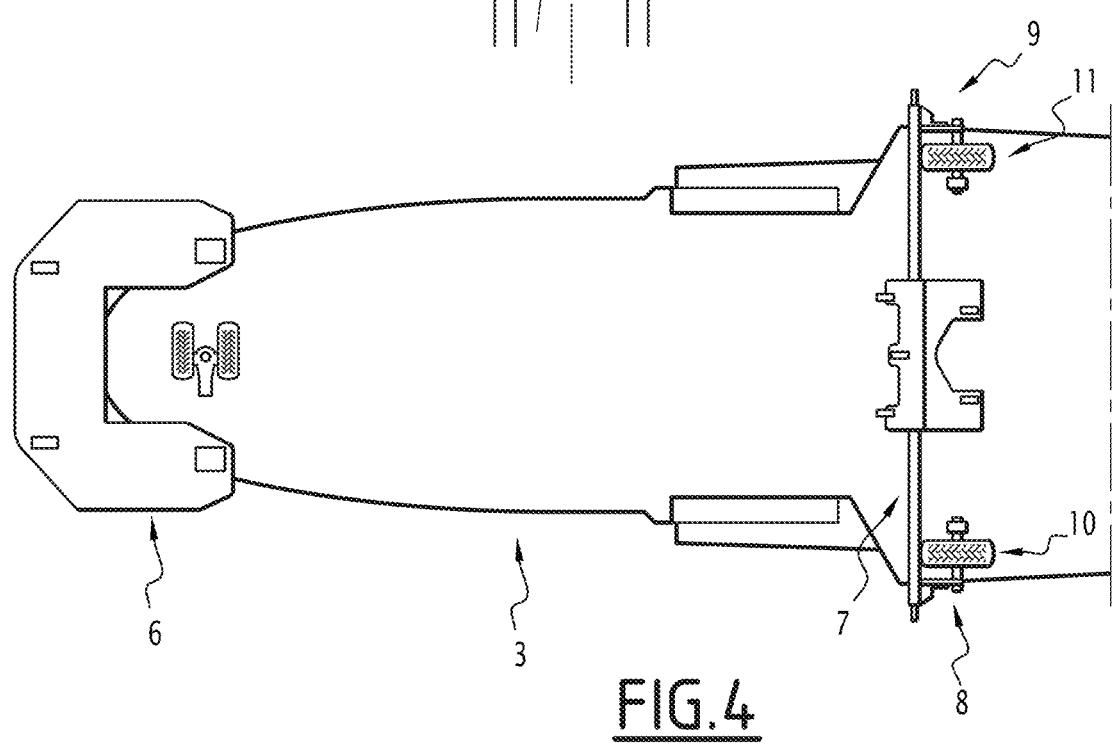
FIG. 4 shows a bottom view of an aircraft equipped with such aircraft handling system.
Figure 5:
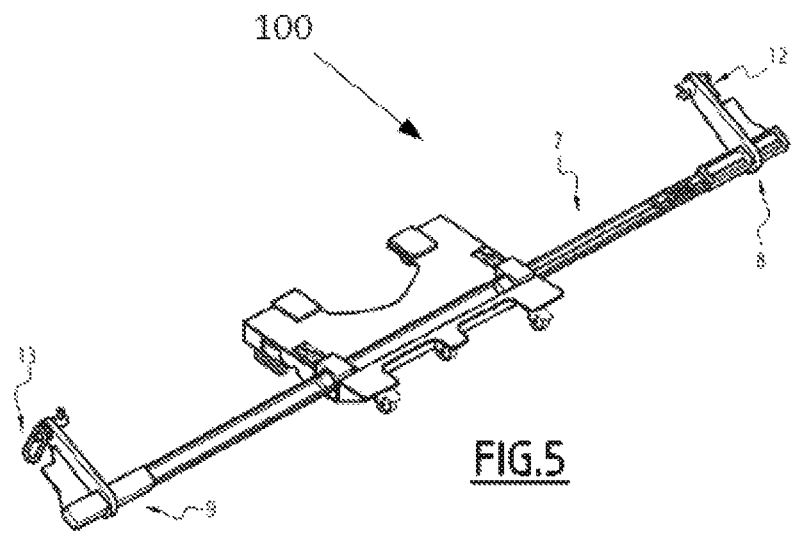
FIG. 5 shows a perspective view of an example embodiment of a member that is a gripping and securing bar of landing gear of an aircraft.

As can be seen more clearly in FIGS. 4 and 5, this member that is a gripping and securing bar 7 includes, at its ends, gripping devices 8 and 9, respectively, for coupling or gripping tires, for example 10 and 11, respectively, of the main landing gear of the aircraft 3, in order to grip said tires and connect the gripping and securing bar 7 to the aircraft 3, through its main landing gear.

This gripping and securing bar 7 for gripping and securing the landing gear of the aircraft also includes, at its ends, attachment devices 12 and 13 for attaching first ends of cables for powering and securing the aircraft 3, designated by general references 14 and 15, and provided on either side of the aircraft.

These powering and securing cables of the aircraft for example extend symmetrically on either side of the longitudinal axis of the zone and the platform.

The attachment devices 12 and 13 comprise any form of complementary hooks, for example.

The second ends of these power and securing cables 14 and 15 are in turn associated with maneuvering and powering systems.

Figure 2:
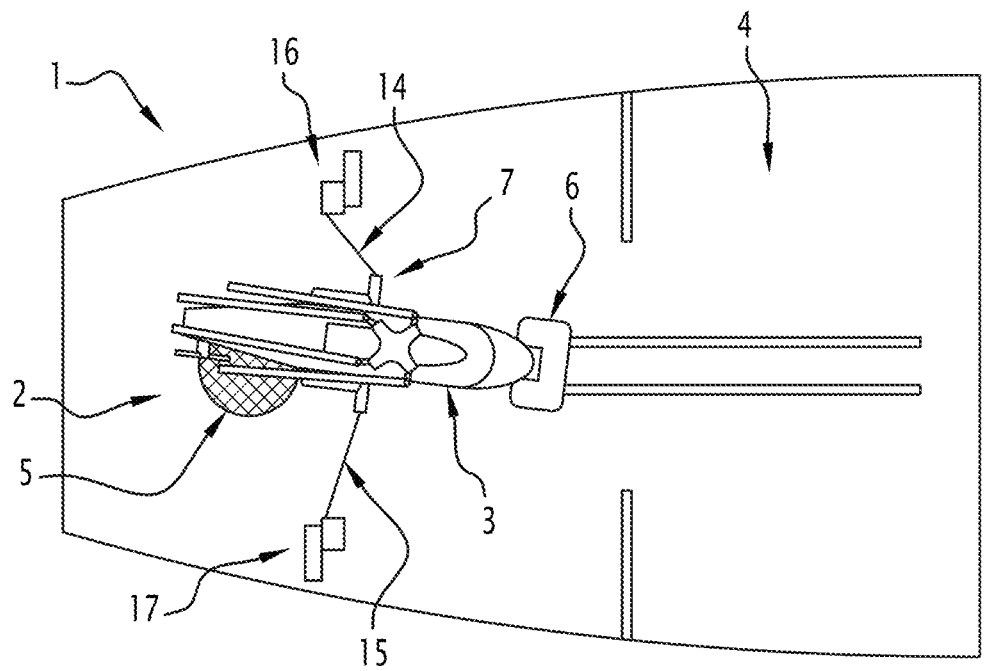
FIGS. 2 and 3 show top views of such a zone equipped with an example embodiment of an aircraft handling system, included in the makeup of a platform according to the invention.
Figure 3:
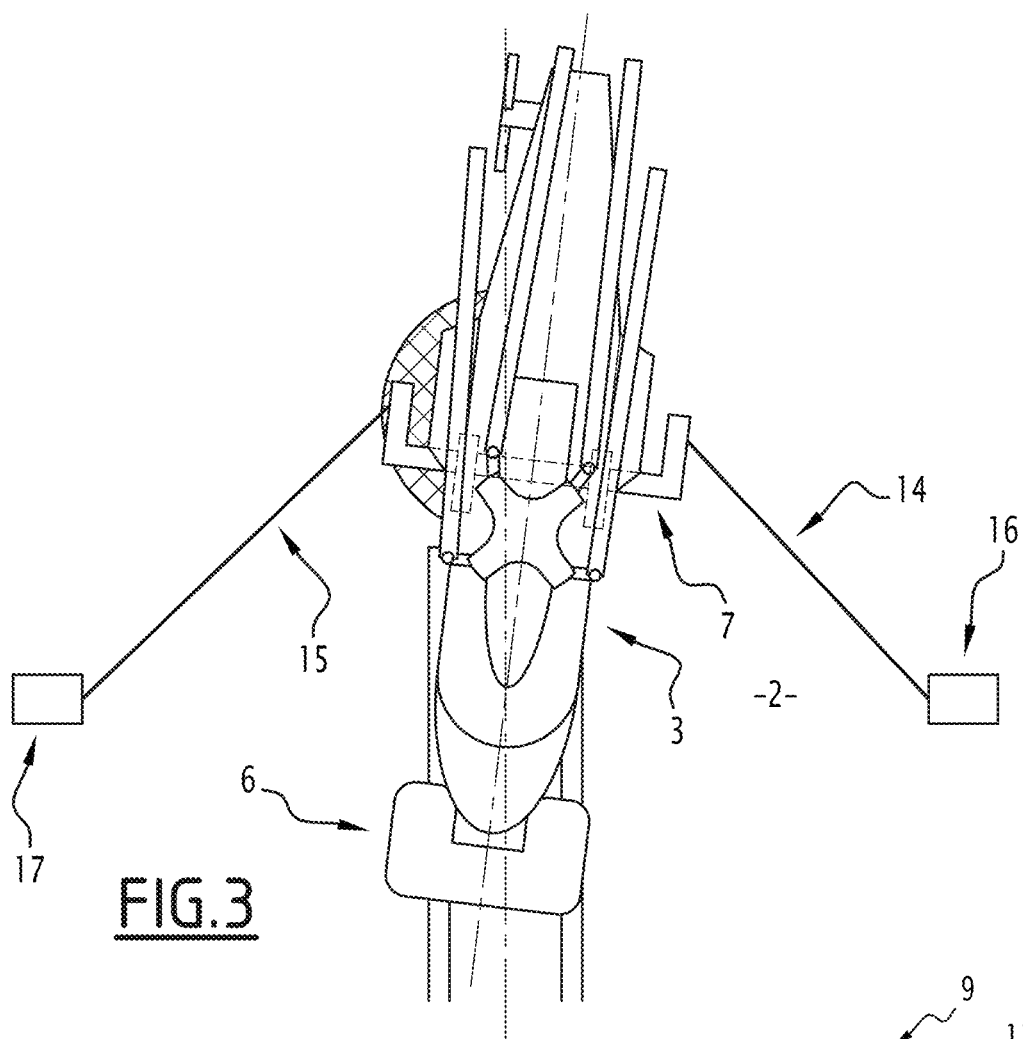

The maneuvering and powering systems are respectively designated by references 16 and 17 in these figures, and in particular in FIGS. 2 and 3.

The maneuvering and powering system of these cables will be described in more detail hereinafter.

It will simply be noted for the moment that the maneuvering and powering systems comprise a traction force application device applying a traction force on the cable in order to secure the aircraft, through the member in gripping and securing bar form of the main landing gear thereof.

This member is in fact associated with the tires of the main landing gear of the aircraft in order to secure the movements thereof.

FIGS. 4, 5, 6, 7, 8, 9 and 10 show a more detailed example embodiment of this member that is a gripping and securing bar.

The latter is still designated by general reference 7 in these figures, and the platform is designated by general reference 1, and more specifically, the deck landing/takeoff zone thereof is designated by general reference 2.

Indeed and as illustrated in these figures, the platform includes, between the deck landing/takeoff zone 2 and for example the storage hangar 4 of the aircraft, at least one rail for guiding and securing the movements of the gripping and securing bar 7 that is a gripping and securing bar and therefore of the aircraft.

Indeed and in the illustrated example, two parallel rails are shown.

Figure 6:
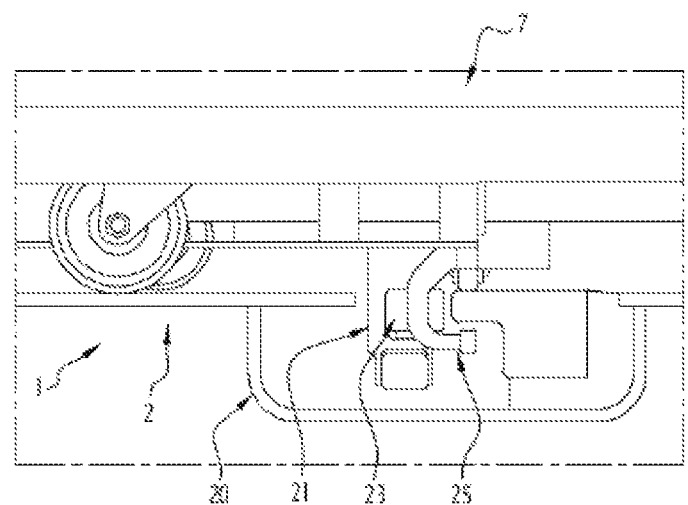
FIGS. 6, 7, 8, 9 and 10 illustrate different views of said member that is a gripping and securing bar of landing gear and the deck landing/takeoff zone of the platform.
Figure 7:
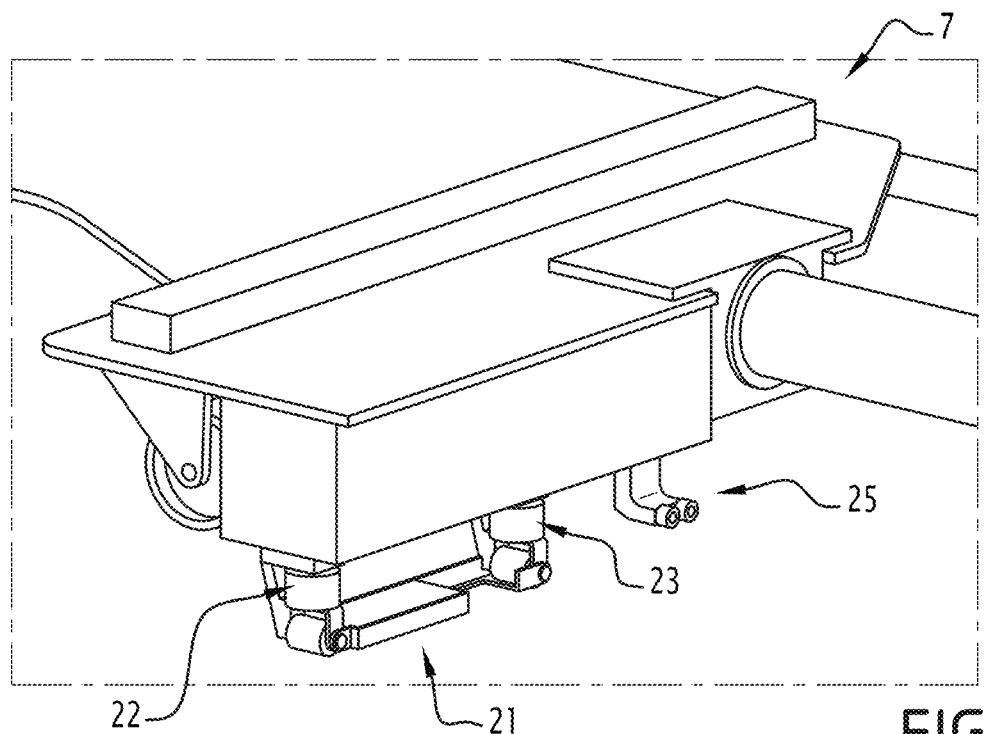

One of these rails is illustrated in more detail and is designated by general reference 20 in FIG. 6.

This rail 20 is then suitable for receiving a guide and force reacting device associated with the gripping and securing bar 7.

Said guide and force reacting device is for example designated by general reference 21 in said figures.

These devices in fact for example include force reacting and guide rollers suitable for cooperating with the edges of the rail.

Said guide and force reacting rollers are for example designated by references 22 and 23 in said figures.

Furthermore, the member that is the gripping and securing bar 7 also includes an anchoring hook that is then movable by sliding in the guide rail(s), during movements thereof and therefore of the aircraft in order to secure it.

The anchoring hook is designated by general reference 25 in these figures.

One can in fact see that the anchoring hook is therefore placed and moves in the rail 20, in order to keep the gripping and securing bar 7, and therefore the aircraft during its movements, in position.

Figure 8:
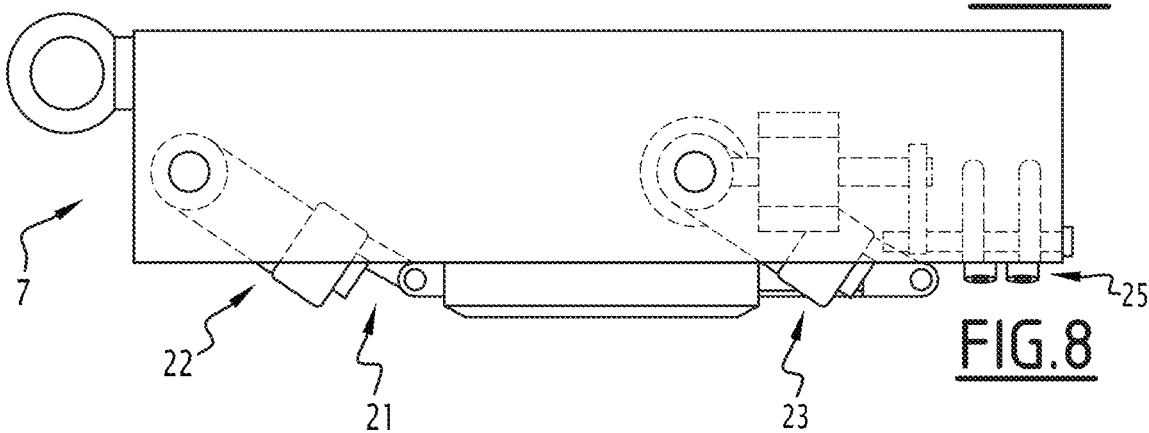
Figure 9:
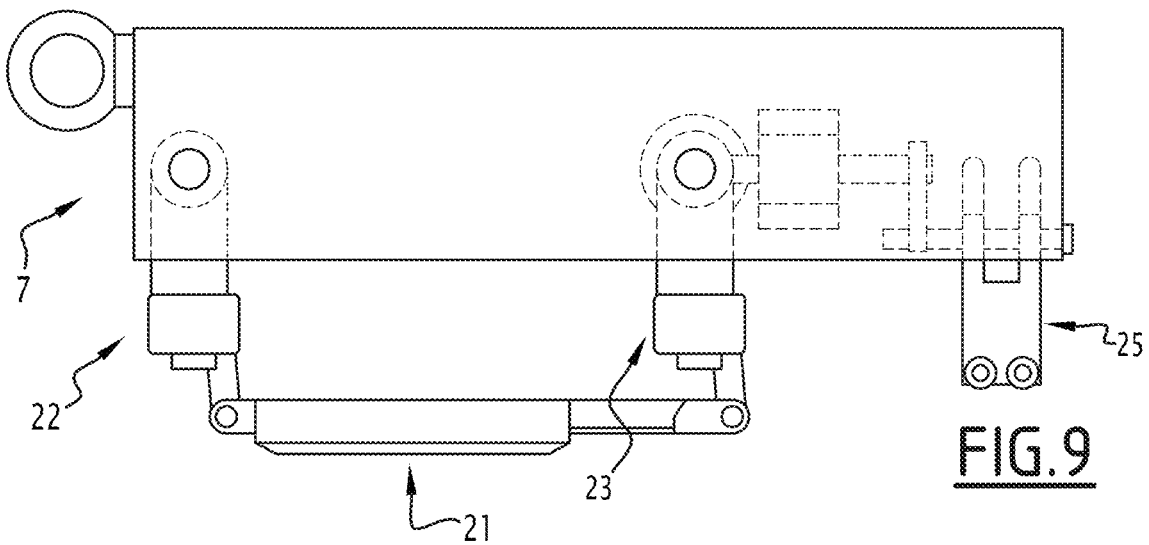

However and as illustrated in these figures and in particular in FIGS. 8 and 9, one can see that the anchoring hook 25 and the guide and force reacting device 21 are retractable, to free the member that is the gripping and securing bar 7, from the rail 20.

In the retracted position of the guide and force reacting device 21 and the anchoring hook, as illustrated for example in FIG. 8, the gripping and securing bar 7 of the main landing gear of the aircraft, is therefore completely free with respect to the platform.

It can then be moved freely on the platform, by the operators.

One can then see that when the personnel in the aviation zone of the platform wishes to maneuver an aircraft set down on the deck landing/takeoff zone, irrespective of the location where the latter is set down, it is possible for these operators to move this gripping and securing bar 7 and to place it in the gripping position on the tires of the main landing gear of the aircraft.

Once this gripping and securing bar 7 is in the attaching position of the tires of the landing gear of the aircraft, the operators can then grip the cables 14 and 15 in order to attach their corresponding ends on the additional 12 and 13 provided at the end of said gripping and securing bar 7.

The maneuvering and powering systems 16 and 17 to maneuver and power these cables are then controlled to secure the movements of the aircraft on the platform.

The operators can then move the aircraft and the member that is the gripping and securing bar, to a location in which the gripping bar member is facing the corresponding guide rail(s) of the platform.

More particularly, the operators move the aircraft 3 and the gripping and securing bar 7 thereof, until the guide and force reacting device 21 and the anchoring hook 25 of said gripping and securing bar 7, are facing the rail(s), and in particular the rail 20.

In this position, the operators can then move said guide and force reacting device 21 and the anchoring hook 25, from their retracted position, illustrated in FIG. 8 for example, for moving the gripping and securing bar 7, to their active anchoring position, illustrated for example in FIG. 6, via a maneuvering device.

Figure 10:
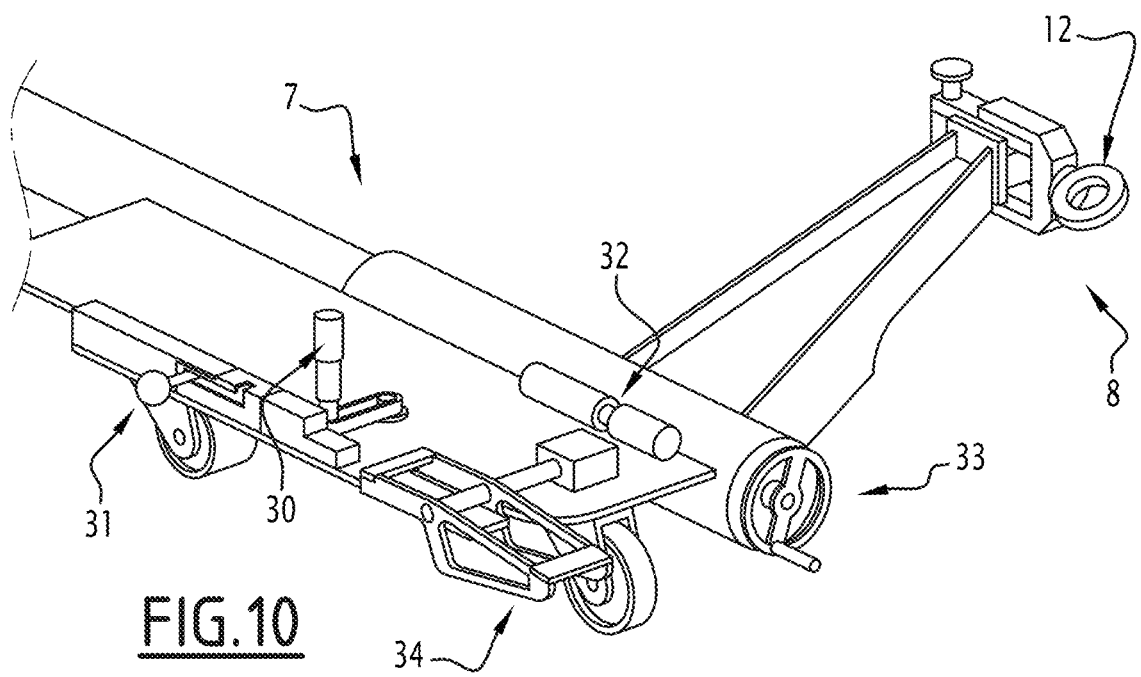

The maneuvering device is for example made up of a lever or crank for controlling the guide and force reacting device 21 and the anchoring hook 25, the maneuvering device being designated by general reference 30 in FIG. 10.

This control crank 30 is for example associated with a handle for locking said guide and force reacting device 21 and the anchoring hook 25 in the active position, designated by general reference 31 in this FIG. 10.

Of course, an indicator bar as designated by general reference 32 in this FIG. 10 can be associated with said guide and force reacting device 21 and the anchoring hook 25, and be movable between different positions to indicate visually to the operators, the active or retracted position and locked or unlocked position, of the guide and force reacting device 21 and the anchoring hook 25 of the gripping and securing bar 7.

Of course, other embodiments can be considered.

As is also illustrated in this FIG. 10, various complementary functions can be provided on the member that is the gripping and securing bar.

Thus for example, it is possible to provide an adjusting system making it possible to adjust the separation of the ends of this member, in order to adapt this separation and therefore the gripping member, to the configuration of the aircraft.

The system must in fact be able to be adapted to maneuver different types and sizes of aircraft.

Said adjusting system is for example made up of a crank designated by general reference 33 in this FIG. 10.

A brake pedal of the member, designated by general reference 34, can also be provided.

Of course, still other functions may also be considered.

Figure 11:
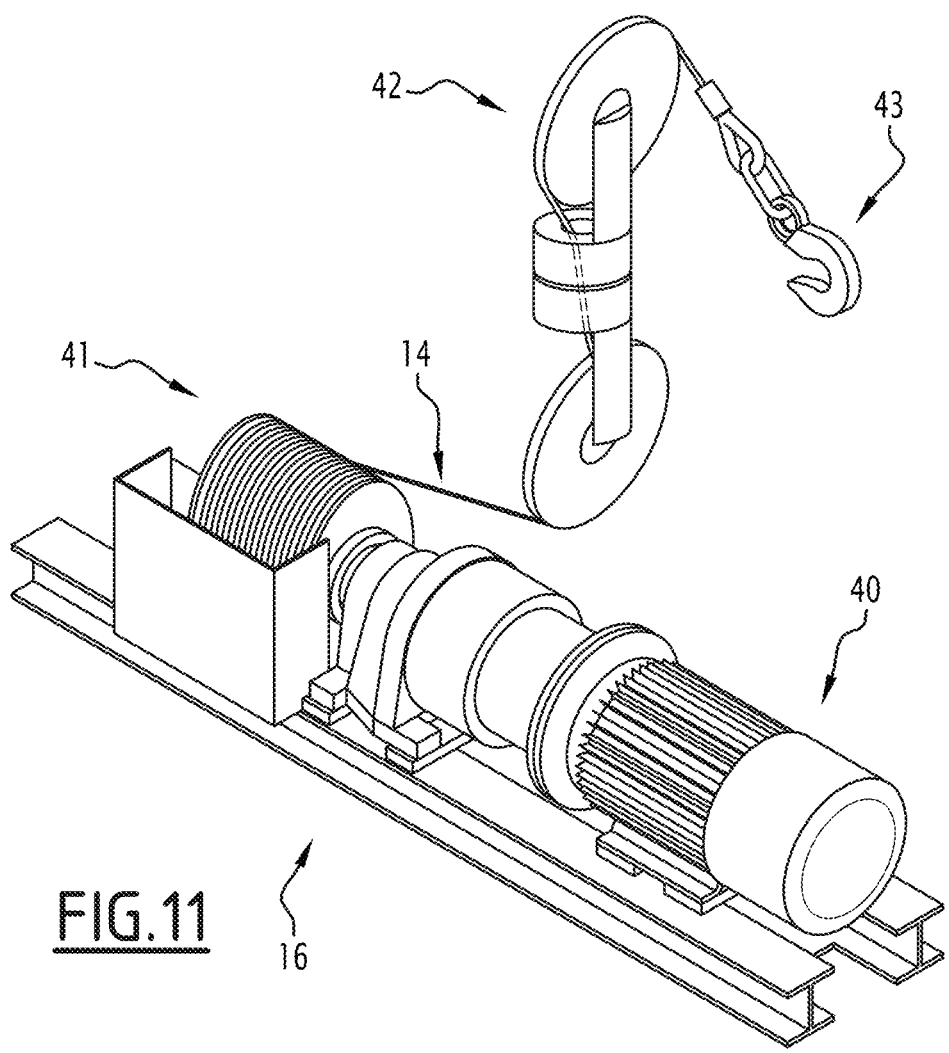
FIG. 11 shows a perspective view of an example embodiment of a maneuvering and powering system configured to maneuver and power on said member that is a gripping and securing bar.

FIG. 11 shows one possible example embodiment of a maneuvering and powering system on said member in the form of a gripping and securing bar.

Such maneuvering and powering system for example extends symmetrically on either side of the longitudinal axis of the platform and the deck landing zone, as illustrated in FIGS. 2 and 3.

FIG. 11 for example shows the production of the maneuvering and powering system designated by general reference 16.

Indeed, the maneuvering and powering system 16 for example comprises an electric gear motor designated by general reference 40, associated with a drum 41 for winding/unwinding a cable, for example the cable designated for instance by general reference 14 in these figures.

This cable 14 is then for example associated with a mechanism, designated by general reference 42, with return pulleys for returning said cable 14 toward the deck landing/takeoff zone.

At its corresponding free end, said cable 14 includes a cable attaching device 43 intended to cooperate with the complementary attachment devices for example 12 and 13 of the gripping and securing bar 7.

A traditional controller of the gear motor make it possible to control its power supply to secure the movements of the aircraft.

One can then see that the use of this system is as follows.

When an aircraft 3 is set down on the deck landing/takeoff zone 2, and it is appropriate to move it for example toward the storage hangar 4 of the platform 1, the operators of the aviation zone of the platform use the gripping and securing bar 7.

The guiding and force reacting device 21 and anchoring hook 25 are then placed in the retracted position, such that the gripping and securing bar 7 is free to move over the zone and the platform.

The operators move said gripping and securing bar 7 over the deck landing/takeoff zone 2, which allows them to bring said gripping and securing bar 7 into contact with the landing gear of the aircraft 3, irrespective of the position thereof over the deck landing/takeoff zone of the platform.

The operators couple the gripping and securing gripping and securing bar 7 to the tires of the landing gear of the aircraft 3.

Next, they attach the corresponding ends of the cables 14 and 15 to the ends of said gripping and securing bar 7, and more particularly the attachment devices 12 and 13 thereof.

The operators can also use the industrial motorized truck 6 associated for example with the auxiliary landing gear of the aircraft 3, to move said aircraft.

During said movement of the aircraft, the maneuvering and powering systems 16 and 17 are controlled to secure the movement of the aircraft, i.e., to prevent the latter in particular from skidding or tilting over the deck landing/takeoff zone.

This movement of the aircraft continues until the gripping and securing bar 7, and more particularly the guide and force reacting device 21 and the anchoring hook 25 thereof, are located facing the complementary guide rails for example 20, arranged in the platform.

Once in this position, the operators maneuver the controller 30 of said guide and force reacting device and the anchoring hook of the gripping and securing bar 7, to move them from their retracted position to their active position in the rails.

The operators next actuate the locking handle 31 of said guide and force reacting device and the anchoring hook in the active position.

Once in this position, said guide and force reacting device and the anchoring hook make it possible to secure the movements of the aircraft on the platform for the rest of the maneuvering thereof, between the zone and the hangar, since the gripping and securing member is in the attachment position in the rail(s) of the platform.

Thus and owing to the cables and the powering system thereof, the security of the aircraft, the platform and the personnel is provided even when the gripping member is not locked in the rails.

Of course, still other embodiments can be considered.

The invention claimed is:

1. A naval platform comprising:
   a deck landing/takeoff zone for at least one aircraft; and
   an aircraft handling system configured to move said at least one aircraft over said deck landing/takeoff zone, the aircraft handling system comprising a gripping and securing bar configured to grip and secure main landing gear of the at least one aircraft, the gripping and securing bar including an anchoring hook mounted such that the anchoring hook is configured to slide in at least one rail configured to guide movements of the anchoring hook, and movements of the at least one aircraft, on the deck landing/takeoff zone, the anchoring hook is retractable to allow a release of the gripping and securing bar from the at least one rail, positioning of said gripping and securing bar such that the gripping and securing bar grips the main landing gear of the at least one aircraft, the movement of the at least one aircraft to bring the gripping and securing bar into position on said at least one rail and the anchoring hook into a position in which the anchoring hook faces said at least one rail, and the movement of said anchoring hook back into an anchoring position in said at least one rail in order to secure the at least one aircraft.

2. The naval platform according to claim 1, wherein the anchoring hook is mounted to be movable between an active anchoring position and a retracted position for movement of the gripping and securing bar, via a lever configured to be manipulated by an operator.

3. The naval platform according to claim 2, further comprising an indicator bar configured to indicate the active or retracted position of the anchoring hook.

4. The naval platform according to claim 1, wherein ends of the gripping and securing bar comprise attachment devices configured to attach first ends of securing cables, second ends of the securing cables being connected to maneuvering devices configured to move and secure the at least one aircraft on the naval platform.

5. The naval platform according to claim 4, wherein the maneuvering devices each comprise a gear motor connected with a drum configured to wind/unwind the securing cables and return pulleys for the securing cables.

6. The naval platform according to claim 4, wherein the maneuvering devices are arranged symmetrically on either side of the deck landing/takeoff zone.

7. The naval platform according to claim 1, further comprising:
   a harpoon grate for the at least one aircraft in the deck landing/takeoff zone; and
   a storage hangar for the at least one aircraft.

8. The naval platform according to claim 7, wherein maneuvering devices are disposed between the deck landing/takeoff zone and the storage hangar to secure the movements of the at least one aircraft between the deck landing/takeoff zone and said at least one rail.

9. The naval platform according to claim 1, wherein the aircraft handling system comprises an industrial motorized truck configured to grip auxiliary landing gear of the at least one aircraft to move the at least one aircraft.

10. The naval platform according to claim 1, wherein the at least one rail comprises two parallel guide rails.

11. The naval platform according to claim 2, wherein ends of the gripping and securing bar comprise attachment devices configured to attach first ends of securing cables, second ends of the securing cables being connected to maneuvering devices configured to move and secure the at least one aircraft on the naval platform.

12. The naval platform according to claim 3, wherein ends of the gripping and securing bar comprise attachment devices configured to attach first ends of securing cables, second ends of the securing cables being connected to maneuvering devices configured to move and secure the at least one aircraft on the naval platform.

13. The naval platform according to claim 5, wherein the maneuvering devices are arranged symmetrically on opposite sides of the deck landing/takeoff zone.

14. The naval platform according to claim 2, further comprising:
- a harpoon grate for the at least one aircraft in the deck landing/takeoff zone; and
- a storage hangar for the at least one aircraft.

15. The naval platform according to claim 3, further comprising:
- a harpoon grate for the at least one aircraft in the deck landing/takeoff zone; and
- a storage hangar for the at least one aircraft.

16. The naval platform according to claim 4, further comprising:
- a harpoon grate for the at least one aircraft in the deck landing/takeoff zone; and
- a storage hangar for the at least one aircraft.

17. The naval platform according to claim 5, further comprising:
- a harpoon grate for the at least one aircraft in the deck landing/takeoff zone; and
- a storage hangar for the at least one aircraft.

18. The naval platform according to claim 6, further comprising:
- a harpoon grate for the at least one aircraft in the deck landing/takeoff zone; and
- a storage hangar for the at least one aircraft.

19. The naval platform according to claim 2, wherein the aircraft handling system comprises a motorized truck configured to grip auxiliary landing gear of the at least one aircraft to move the at least one aircraft.

20. The naval platform according to claim 3, wherein the aircraft handling system comprises a motorized truck configured to grip auxiliary landing gear of the at least one aircraft to move the at least one aircraft.

* * * * *